M. PETERSON.
GAGE.
APPLICATION FILED APR. 3, 1919.
1,317,099.
Patented Sept. 23, 1919.
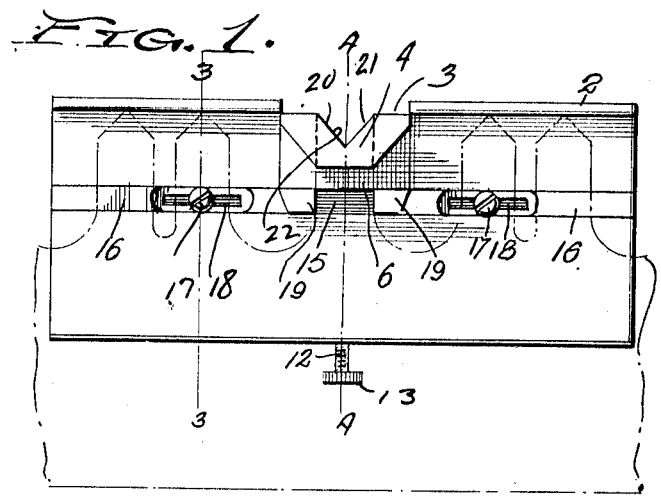
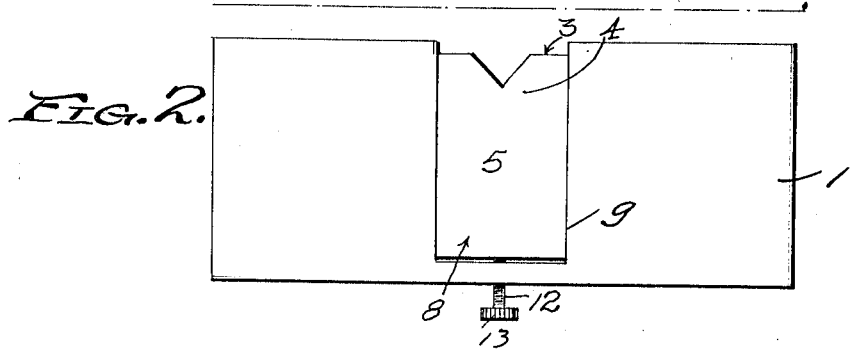
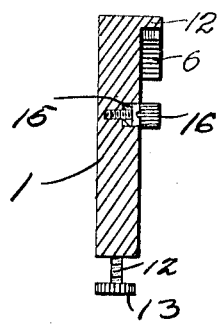
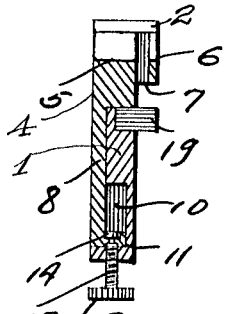
WITNESSES
INVENTOR.
Mitchell Peterson
BY
ATTORNEY.

UNITED STATES PATENT OFFICE.

MITCHELL PETERSON, OF ERICSBURG, MINNESOTA.

GAGE.

1,317,099.          Specification of Letters Patent.          Patented Sept. 23, 1919.

Application filed April 3, 1919. Serial No. 287,145.

*To all whom it may concern:*

Be it known that I, MITCHELL PETERSON, a citizen of the United States, residing at Ericsburg, in the county of Koochiching and State of Minnesota, have invented certain new and useful Improvements in Gages, of which the following is a specification.

This invention relates to gages and more particularly to a saw tooth gage, the primary object being to provide a device which may be used in filing the teeth of the saw so that accuracy in obtaining the proper angle for the cut may be assured.

The invention aims to provide an improved device which may be attached to the saw blade and receive one of the teeth so that the cutting edge may be filed at the proper angle, the arrangement of the gage being such as to permit both styles of teeth to be readily and accurately filed.

A further object of the invention is to provide a device of this character which consists of comparatively few parts and is simple in construction but durable and well adapted to withstand the rough usage to which devices of this character are ordinarily subjected.

For a full description of the invention and the advantages and merits thereof, reference is to be had to the following description and accompanying drawings, in which:—

Figure 1 is a front elevation of the gage constructed in accordance with my invention and showing its application to a saw blade.

Fig. 2 is a rear elevation of the same,

Fig. 3 is a section taken on the line 3—3 of Fig. 1.

Fig. 4 is a section taken on the line 4—4 of Fig. 1.

Referring to the drawings, wherein is illustrated the preferred form of my invention, in which like numerals of reference indicate like or corresponding parts throughout the several views, the gage plate 1 is of substantially rectangular formation and is provided with a longitudinally extending lip 2 which rests upon the upper ends of the teeth when the gage is in position as shown in Fig. 1. Intermediate the ends of the plate, a portion is removed to provide the relatively large recess 3 within which the filing head 4 is received. This head comprises a sliding block 5 which is adapted to be vertically adjusted in the recess 3 and is provided with a forwardly projecting enlarged portion 6 through which a slot 7 is formed as shown to advantage in Fig. 4. A depending flange 8 is attached to the head 5, being preferably integrally formed therewith and is received in a rear depression 9 which has a deeper portion near its lower end thereby providing a pocket 10 and the lower end of the flange 8 is provided with a ledge 11 extending into the pocket 10 as shown to advantage in Fig. 4. The bottom of the plate is provided with an adjustable screw 12 having a head 13 and one end is attached to the ledge or ear 11 as indicated at 14 whereby the head 5 may be vertically adjusted when the screw 12 is turned.

A longitudinally extending groove 15 is provided in the front face of the plate 1 and this groove receives the slidably mounted bars 16 which are held in position by fastening elements 17 passed through slots 18 in the bars whereby the latter may be longitudinally adjusted. The adjacent ends of the bars are provided with laterally projecting fingers 19 the proximate faces of which are perfectly flat as shown to advantage in Fig. 1 whereby the edges of one of the teeth of the saw may be engaged to hold the latter firmly in position while being filed.

In use, as shown in Fig. 1, the gage is mounted upon the saw blade so that one of the teeth is received in the slot 7 whereupon the screw 12 will be turned until the cutting edge of the tooth is in proper position with respect to the angular faces 20 and 21 formed by the V-shaped cut 22 in the head 5. These angular faces are properly finished to be disposed at the proper angle so that they will guide the file when it is being actuated to file the edge of the tooth. When the tooth is of the V-shaped type it may be filed when placed in the position shown by dotted lines in Fig. 1, as the angularly disposed surfaces 20 and 21 will properly guide the file to saw the cutting edges. When the pointed type of tooth is to be filed, the gage will be moved so that one edge of the tooth is in vertical alinement with the center of the V-shaped cut 22 so that one of the angular edges of the tooth will be alined with one of the angular faces 20 or 21 and the fingers 19 will then be adjusted to engage the edges of the tooth whereby it will be properly held in position for filing. Obviously the fingers 19 may also be adjusted for holding a narrower tooth firmly in position to be filed.

The foregoing description and accompanying drawing have reference to what might be considered to be the approved or preferred form of my invention. I desire it to be understood that I may make such changes in the construction, combination and arrangement of parts, materials, dimensions, et cetera, as may prove expedient and fall within the scope of the appended claim.

Having thus fully described my invention what I claim as new and desire to secure by Letters Patent, is:—

A saw gage comprising a plate having a slidably mounted head equipped with a V-shaped recess, the said plate being provided with longitudinal grooves, clamp members longitudinally adjustably mounted in the said grooves and provided with laterally extending fingers, the said head having a projecting portion provided with a slot to receive the tooth of the saw, the said fingers being extended from the said clamp members beneath the said slot.

In testimony whereof I affix my signature in presence of two witnesses.

MITCHELL PETERSON.

Witnesses:
JAMES WILKINS,
F. M. SHEPARD.

Copies of this patent may be obtained for five cents each, by addressing the "Commissioner of Patents, Washington, D. C."